United States Patent Office 3,714,337
Patented Jan. 30, 1973

3,714,337
PREPARATION OF INORGANIC PIGMENTS
Pierre Garet, Thiais, France, assignor to Rhone-Poulenc S.A., Paris, France
No Drawing. Filed Dec. 21, 1970, Ser. No. 100,352
Claims priority, application France, Dec. 23, 1969, 6944647
Int. Cl. C01b 17/20, 19/00
U.S. Cl. 423—508
2 Claims

ABSTRACT OF THE DISCLOSURE

Metal sulphides, sulpho-selenides and selenides are made by heating together at 340 to 450° C. a molten mixture of metal, sulphur and/or selenium, and saline flux.

The present invention relates to the preparation of metal sulphides, sulphoselenides and selenides by direct synthesis from the elements.

Mineral pigments based on metal sulphides and sulphoselenides are used more and more for the coloration of enamels and plastics. They are particularly valuable for their resistance to heat and light, their attractive shades, and their luminescence. They are also used to give thin layers (in photo-electric cells and single crystals having special optical properties).

However, it is not sufficient simply to produce the sulphide or sulphoselenide to be able to use it as pigment. The metal sulphide or sulphoselenide must have certain necessary physical characteristics. In particular, it must possess a crystalline structure and the average particle size must preferably be between 0.1 and 0.6 micron, which corresponds approximately to a specific surface area of between 10 m.$^2$ g. and 2 m.$^2$ g., measured according to the BET method. J. Am. Chem. Soc. 1938, 60, 30g.

The processes usually employed for the preparation of metal sulphides and selenides consist in reacting a compound of sulphur or selenium with a metal compound by a dry or wet method, and subjecting the sulphide or selenide obtained to various purification and finishing treatments.

A process is known for preparing cadmium sulphide and cadmium selenide by reacting cadmium with sulphur and/or selenium (German Auslegeschrift No. 1,293,140). However, in this process it is necessary to use finely divided reactants and to operate at a fairly high temperature, of the order of 650° C.

The present invention provides a process for manufacturing metal sulphides, sulphoselenides and selenides, which comprises heating together at a temperature within the range 340° to 450° C. a molten mixture of (a) a metal, (b) sulphur, sulphur and selenium or selenium, and (c) a saline flux. The reaction is generally carried out in the presence of a catalyst.

The metal used must be reactive and molten at the reaction temperature. Zinc, tin, cadmium and bismuth are suitable. Metals which are not fusible in the pure state at any temperature within the specified range can be used in the new process as alloys which are fusible between 340 and 450° C. For example, certain zinc-copper, copper-tin and antimony-tin alloys can be used.

The molten flux consists of salts which are inert towards the reactants used. It preferably consists of a mixture of alkali metal halides, especially chlorides or bromides, which is totally, or at least partially, molten at the reaction temperature. For example, the eutectic mixture LiCl+KCl having a molar ratio of 59.5/40.5, melting at 352° C., the eutectic mixture LiBr+KBr having a molar ratio of 59.5/40.5, melting at 348° C., and the mixture MgCl$_2$/NaCl/KCl (molar proportions 58/24/18), melting at 400° C., can be used. It is also possible to use mixtures of alkali metal chloroaluminates. For example, such a mixture, melting between 130° and 140° C., can be obtained by fusing at about 300° C. a mixture of one mole of aluminium chloride for each 0.76 mole of sodium chloride and 0.24 mole of potassium chloride.

The catalyst is preferably a sulphide such as an alkali metal sulphide or phosphorus pentasulphide. Alkali metal sulphides can be obtained by reacting sulphur or hydrogen sulphide with lithium hydroxyde or with potassuim hydroxide.

The reaction temperature depends on the reactants used and their concentration, but is generally between 350 and 400° C.

The ratio by weight of the reactants to the flux can vary within fairly wide limits. Generally, it is between ⅓ and 1/10.

It is possible to use only the theoretical amount of sulphur, selenium or the mixture of these two elements. However, a small amount of these elements may sublime in the course of the reaction and remain unused. In practice, therefore, a slight excess of sulphur or selenium is advantageously added (for example up to twice the stoichiometric quantity), so that all the metal introduced is used up. Any excess there may be at the end of the reaction can be removed by bubbling nitrogen through the molten flux. The pigment obtained can also be washed at the end of the operation with an alkali metal sulphite or sulphide solution.

The reaction is generally completed at the end of about fifteen minutes. Nevertheless, it is generally desirable to finish the reaction by supplementary heating at about the same temperature, for a period of between 15 and 60 minutes.

The reactor is provided with a lining known to be resistant to the reactants under the conditions of the process. Glass, graphite, molybdenum, enamelled steel, nickel-containing stainless steel, and nickel-molybdenum alloys containing a high proportion of molybdenum are suitable materials. Good stirring or other form of agitation is necessary to ensure good contact between reactants of different densities. The reaction can be terminated by putting the reaction mixture into an aqueous bath. The pigment is then obtained in a very finely divided state. The coarse particles (generally of metal which has not reacted) are separated by means of a sieve, and the fine suspension obtained is then filtered. The dried precipitate is ready for use.

The reaction may be carried out at atmospheric pressure. Superatmospheric pressures can be used and have the advantage of reducing loss of sulphur and/or selenium from the reaction mixture; but the more expensive equipment required for use of such pressures is rarely economically justified. Sub-atmospheric pressures are possible, but are not preferred.

The pigments obtained, more especially those based on cadmium sulphide or cadmium sulphoselenide, can advantageously be used for colouring the most diverse materials, and in particular plastics materials such as polystyrene, polyamides, polyesters, polyolefines, polyvinyl chloride, polyester resins, epoxy resins and alkyd resins.

The following examples illustrate the invention.

EXAMPLE 1

36.4 g. of lithium chloride and 43.6 g. of potassium chloride are introduced into a borosilicate glass reactor consisting of a tube having a diameter of 40 mm. and a length of 150 mm., the bottom of the tube being provided with a hollow glass bulb (which is broken at the end of the operation to empty the reaction mixture), equipped with a helical borosilicate glass stirrer having a diameter of 30 mm., and with a sheath for a thermocouple. The reactor is heated over an open flame to 360° C., and at the same time 1.9 g. of a mixture of lithium and potassium sulphides, 4 g. of sulphur and then 14 g. of cadmium are added, with gentle stirring.

At the end of 10 minutes at 350° C. the whole mixture is molten; the mixture is then stirred at 1300 r.p.m. and kept for 1 hour at this temperature. The bulb of the reactor is broken and the reaction mixture is received in a 2 l. volume beaker containing 1 l. of water and provided with a magnetic stirrer. An aqueous suspension is thus obtained which is filtered through a stainless steel sieve having a mesh size of 30 microns. 2 g. of solids (essentially of cadmium which has not combined) are thus separated, and part of the sulphur (0.57 g.) remains stuck to the walls of the reactor.

The sieved suspension is filtered, and the solid is washed with water and dried. 14.9 g. of yellow pigment (cadmium sulphide) are thus obtained. The yield is quantitative relative to the cadmium converted.

This pigment has a surface area of about 2.2 m.$^2$/g. (B.E.T. method). When examined by X-ray diffraction it shows a single phase of hexagonal Cds. Elementary chemical analysis confirms the formula CdS. When incorporated in a proportion of 0.4% into polystyrene, this pigment confers a pure yellow coloration which is bright and uniform.

The mixture of lithium and potassium sulphides used as the catalyst in the reaction was prepared in the following manner. 250 g. of water, 118 g. of 35% strength potassium hydroxide solution (0.731 mole), and 45 g. of crystalline lithium hydroxide (1.07 moles) are introduced into a borosilicate glass reactor provided with a magnetic stirrer. After the compounds have dissolved, 30 g. of hydrogen sulphide are passed into the mixture at the rate of 1 l./minute in the cold. The reaction mass is evaporated under a stream of nitrogen. When the reaction mass crystallises, it is heated at 110° C. for 3 hours and then at 150° C. for 3 hours. 66 g. of a mixture of potassium and lithium sulphides are thus obtained. On acidification, 10 g. of this mixture liberate 3.18 g. of hydrogen sulphide.

EXAMPLE 2

The experiment of Example 1 is repeated, but with the difference that twice the amounts of catalyst and reactants are used for the same weight of flux (potassium and lithium chlorides), i.e. 4 g. of the mixture of potassium and lithium sulphides, 8 g. of sulphur, and 28 g. of cadmium. 1.75 g. of unreacted sulphur, 6.15 g. of residue on the sieve having a mesh size of 30$\mu$ (essentially cadmium) and 28 g of CdS pigment are obtained.

The pigment obtained, when incorporated under the same conditions into the plastic used in Example 1, gives a pure yellow coloration identical to that obtained with the pigment prepared in Example 1.

EXAMPLE 3

41.4 g. of lithium bromide and 38.6 g. of potassium bromide are introduced into a reactor as described in Example 1. The reactor is heated to 340° C. and then 1.9 g. of a mixture of alkali metal sulphides prepared as in Example 1 and 4 g. of sulphur are added simultaneously, followed by 14 g. of cadmium. As soon as the cadmium has melted the mixture is stirred at 1300 r.p.m. The reaction begins vigorously; the temperature rises immediately from 340 to 410° C. in two minutes and then falls back to 370° C. The reaction mixture is kept at 370° C. for one hour and is then worked up as previously. The results are as follows:

|  | G. |
|---|---|
| Sulphur remaining in the reactor | 1 |
| Residue on the sieve having a mesh size of 30$\mu$ | 3.1 |
| Cadmium sulphide | 13.5 |

The pure yellow pigment obtained is incorporated in a proportion of 0.4% into polystyrene. The coloration obtained is substantially identical to the coloration obtained in Example 1.

EXAMPLE 4

46.4 g. of lithium chloride and 33.6 g. of potassium chloride are introduced into the reactor described in Example 1, the whole is heated to 370° C. and the major proportion of the mass (three quarters) liquifies. 2.1 g. of the mixture of sulphides prepared in Example 1 and 4.32 g. of sulphur are added simultaneously, followed by 14 g. of a cadmium-zinc alloy containing 12% by weight of zinc (melting at about 280° C.). After 10 minutes the mixture is stirred at 1300 r.p.m. and kept at between 370 and 380° C. for 1 hour. The reaction mass is then worked up as in Example 1. The results are as follows:

|  | G. |
|---|---|
| Sulphur remaining in the reactor | 0.8 |
| Residue on the sieve having a mesh size of 30$\mu$ | 1 |
| Yellow pigment (zinc and cadmium sulphide) | 15.6 |
| (theory 18.3 g.) | |

This pigment has a specific surface area of 2.3 m.$^2$/g. and consists of a single crystalline phase of CdS-ZnS. Percentage analysis confirms very closely the theoretical molecular composition, that is 18.5% ZnS and 81.5% CdS. When incorporated in a proportion of 0.4% into polystyrene it confers a lemon-yellow coloration which is bright and uniform.

EXAMPLE 5

36.4 g. of lithium chloride and 43.6 g. of potassium chloride are introduced into a reactor as described in Example 1, and the whole is heated to 350° C. 2.5 g. of the mixture of alkali metal sulphides prepared in Example 1 and 6.5 g. of sulphur (1.5 times the theoretical amount) are then added, followed by 14 g. of a Cd-Zn alloy containing 12% by weight of zinc. The mixture is kept for 1 hour at 375° C. with stirring at 1300 r.p.m., and is then worked up as previously, with the difference that the pigment which has passed through the sieve having a mesh size of 30$\mu$ is washed with a solution of 30 g. of neutral sodium sulphide nonahydrate in 0.25 l. of water. The results are as follows:

|  | G. |
|---|---|
| Sulphur remaining in the reactor | 1 |
| Residue on the sieve having a mesh size of 30$\mu$ | 2.9 |
| Lemon-yellow pigment | 14.3 |

This pigment is practically identical to that obtained in Example 4.

EXAMPLE 6

36.4 g. of lithium chloride and 43.6 g. of potassium chloride are introduced into a reactor as described in Example 1, and the whole is heated to 350° C. 0.5 g. of a mixture of alkali metal sulphides prepared as in Example 1, 2.46 g. of sulphur (0.0768 gram atom), and 2.85 g. of selenium (0.0361 gram atom) are then added. The whole is left in contact for 10 minutes and 11.15 g. of cadmium are then added (0.0992 gram atom, that is to say 1 atom of cadmium per 1.14 atoms of the mixture of sulphur and selenium). After 10 minutes, the mixture is stirred at 1300 r.p.m. and the temperature is raised to 370° C. and maintained at this value for 1 hour. After working up as in Example 1, the results obtained are as follows:

|  | G. |
|---|---|
| Sulphur + selenium stuck to the walls of the reactor | 1.5 |
| Residue on the sieve having a mesh size of 30$\mu$ | 1.8 |
| Red pigment | 12.7 |
| (theory 16.46 g.) | |

This pigment has a specific surface area of 5.1 m.$^2$/g.; it consists principally of a hexagonal cadmium sulphoselenide phase. When incorporated in a proportion of 0.4% into polystyrene, it confers a pure red coloration which is bright and uniform.

EXAMPLE 7

58 g. of lithium chloride and 42 g. of potassium chloride are introduced into a reactor identical to that of Example 1. The whole is heated to 390° C. and 10 g. of a cadmium-bismuth alloy containing 5% by weight of bismuth are added. 4.23 g. of sulphur (1.5 times the theoretical amount) are added when the whole mixture is molten. The mixture is stirred at 1300 r.p.m. while the temperature is kept at 390° C. for 1 hour; it is then worked up as in Example 5. The results are as follows:

|  | G. |
|---|---|
| Residue on the sieve having a mesh size of 30μ | 1 |
| Pigment | 11.7 |

This pigment has a specific surface area of 2.6 m.²/g. (B.E.T. method). When incorporated in a proportion of 0.4% into polystyrene it confers a sepia-tinged yellow coloration which is bright and uniform.

EXAMPLE 8

36.4 g. of lithium chloride and 43.6 g. of potassium chloride are introduced into a reactor identical to that described in Example 1. The whole is heated to 350° C. and 1.7 g. of a mixture of alkali metal sulphides prepared as in Example 1 and 9.6 g. of sulphur (0.3 gram atom) are added. 11.87 g. of tin (0.1 gram atom) are next introduced at 360° C. in small portions within 10 minutes. The whole is stirred at 1300 r.p.m. for 1 hour at 380° C., and then a farily rapid stream of nitrogen is passed for a few minutes, which lightly touches the stirred surface and thus carries away the excess sulphur. The reaction mass is then worked up as described in Example 1. The results are as follows:

|  | G. |
|---|---|
| Residue on the sieve having a mesh size of 30μ | 1.08 |
| Pigment | 17.15 |

This pigment has a specific surface area of 6.8 m.²/g. When incorporated in a proportion of 0.4% into polystyrene, it confers a lasting, uniform, light-brown coloration.

I claim:

1. Process for manufacturing a metal sulphide, sulphoselenide or selenide which comprises heating together at a temperature within the range 340° to 450° C. a molten mixture of (a) zinc, tin, cadmium, bismuth, or a mixture thereof, or a zinc-copper, tin-copper, or tin-antimony alloy which is liquid at the reaction temperature, (b) sulphur, sulphur and selenium, or selenium, and (c) as saline flux, a mixture of alkali metal chlorides, bromides, or chloroaluminates which is liquid at the reaction temperature, the weight ratio of flux (c) to reactants (a) and (b) being 3:1 to 10:1.

2. Process according to claim 1 in which an alkali metal sulphide or phosphorus pentasulphide is also present as catalyst.

References Cited

UNITED STATES PATENTS

| 3,342,546 | 9/1967 | Reisman et al. | 23—50 R |
| 3,079,229 | 2/1963 | Garrett et al. | 23—134 |
| 3,374,067 | 3/1968 | Johnson et al. | 23—135 X |

FOREIGN PATENTS

| 1,293,140 | Germany. |

OTHER REFERENCES

Beck et al., A.P.C. Published Application, S.N. 292,742, July 13, 1943.

Beck et al., A.P.C. Published Application, S.N. 393,258, July 13, 1943.

HERBERT T. CARTER, Primary Examiner

U.S. Cl. X.R.

423—509, 561